Patented Aug. 11, 1931

1,818,076

UNITED STATES PATENT OFFICE

ARTHUR LUETTRINGHAUS, OF MANNHEIM, HEINRICH NERESHEIMER, OF LUDWIGS-HAFEN-ON-THE-RHINE, AND HANS JOSEF EMMER, OF MANNHEIM, GERMANY, ASSIGNORS TO GENERAL ANILINE WORKS, INC., OF NEW YORK, N. Y., A CORPORATION OF DELAWARE

DERIVATIVES OF BENZANTHRONE

No Drawing. Application filed December 7, 1928, Serial No. 324,576, and in Germany March 9, 1928.

The present invention relates to the production of 2-alkylbenzanthrones.

In our copending application Serial No. 323,561 for an improvement in the production of "condensation products of the benzanthrone series" filed Dec. 3, 1928 we have, inter alia, described that by treating a mixture of a benzanthrone with an unoccupied 2-position with a ketone of the general formula R'—CO—CH$_2$—R, in which R and R' are hydrocarbon radicles which may be substituted, if desired, or in which R may also be hydrogen, with an alkaline condensing agent new condensation products are obtained of the general formula

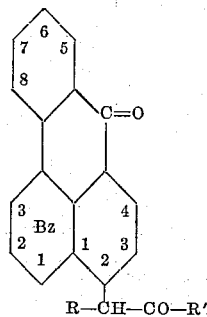

We have now found that these condensation products may be split up by treatment with alkaline saponifying agents such as, for example, aqueous or alcoholic alkalies, according to the following equation:

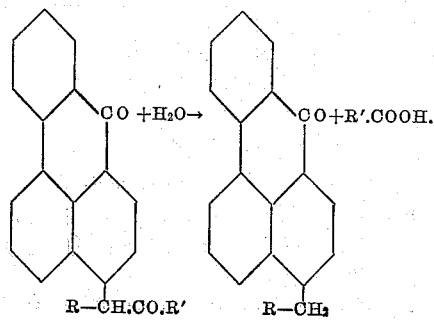

The cleavage of the condensation products by means of alkaline saponifying agents, such as caustic alkalies or weak alkaline agents, for example, calcium hydroxide, barium hydroxide, takes place very readily, in good yields of, for example, 2-methyl-benzanthrone and acetic acid are obtained by heating 2-acetonyl-benzanthrone which can be prepared by treating benzanthrone and acetone in benzene with caustic potash, in 5 per cent alcoholic caustic potash solution. 2-methyl-benzanthrone and benzoic acid are obtained from 2-phenacylbenzanthrone, the latter being prepared by treating benzanthrone and acetophenone in anhydrous pyridine with caustic potash and 2-n-propylbenzanthrone and n-butyric acid are obtained from the condensation product of benzanthrone with di-n-propyl ketone. In many cases it is preferable to carry out in one operation both the preparation of the condensation products, according to our said co-pending application, and the splitting up of the same.

According to the present invention, for example, the industrially important 2-methylbenzanthrone which hitherto could only be obtained from 2-methylanthraquinone, and also hitherto unknown homologues of the same, i. e. benzanthrones substituted in the 2-position by an alkyl group containing more than one carbon atom may be obtained. These homologues may be further substituted in the benzanthrone ring system as well as in the alkyl group and are adapted to be used for the preparation of dyestuffs.

The following examples will further illustrate the nature of the invention, but the invention is not restricted to these examples. The parts are by weight.

Example 1

A suspension of 10 parts of 2-acetonyl-benzanthrone in 200 parts of 10 per cent aqueous caustic soda solution is kept boiling for about 2 hours. After crystallization from benzene the reaction product has a melting point of about 198° C.; it is 2-methylbenzanthrone.

Example 2

A solution of 10 parts of the condensation product obtainable from benzanthrone and acetophenone having a melting point of 205° to 206° C., together with 5 parts of caustic potash in 100 parts of ethyl alcohol is heated to the boiling point until the characteristic greenish blue coloration has disappeared. The reaction product which crystallizes out after cooling has a melting point of about 198° to 200° C.; it is 2-methylbenzanthrone.

The benzoic acid which has been split off is present in the mother liquor as the potassium salt.

Example 3

10 parts of acetone are introduced at room temperature in an atmosphere of nitrogen, while stirring, into a mixture of 10 parts of benzanthrone, 20 parts of ground caustic potash, and 40 parts of monochlorbenzene, and the mixture is stirred at the same temperature for about 3 hours. The reaction mixture is then diluted with 100 parts of alcohol and is refluxed for about 3 hours. The product which crystallizes out after cooling is practically pure 2-methylbenzanthrone having a melting point of about 198° to 200° C.

Example 4

A mixture of 10 parts of benzanthrone, 30 parts of ground caustic potash, and 40 parts of anhydrous pyridine is treated at room temperature in an atmosphere of nitrogen, while stirring, with 10 parts of di-n-propyl ketone; the stirring is continued at the same temperature for about 4 hours. The blue green reaction mass is poured into ice cold dilute hydrochloric acid, and the brown resin which separates out is dissolved in 100 parts of 5 per cent alcoholic caustic potash solution. This solution is heated to the boiling point on a reflux condenser for about 1 hour, whereby the blue green coloration is gradually changed into an olive green coloration. The reaction product which is 2-propyl-benzanthrone according to its behaviour and analysis separates out after cooling, and is freed from by-products by stirring with acetone; it crystallizes from glacial acetic acid in long golden yellow needles having a melting point of about 130° to 131° C.

Example 5

A suspension of 10 parts of 2-acetonyl-benzanthrone in a solution which contains 40 parts of anhydrous sodium sulfide in 100 parts of ethyl alcohol and 100 parts of water is kept boiling for about 2 hours. The reaction product obtained is 2-methylbenzanthrone identical with that obtained according to Example 1.

Other weak alkaline agents, such as calcium hydroxid or barium hydroxide in alcoholic aqueous solution, may be used instead of sodium sulfide.

What we claim is:

1. A process for the production of 2-alkyl-benzanthrones, which comprises treating a condensation product of a benzanthrone and a ketone corresponding to the general formula:

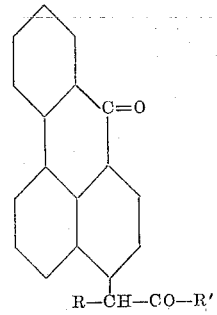

in which R' stands for a hydrocarbon radicle which may be substituted and R stands for an alkyl group, with an alkaline saponifying agent.

2. The process for the production of 2-propylbenzanthrone, which comprises treating the condensation product of benzanthrone and di-n-propyl-ketone corresponding to the formula:

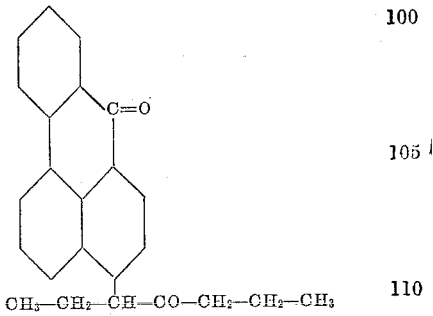

with an alkaline saponifying agent.

3. As a new article of manufacture 2-propylbenzanthrone of the formula:

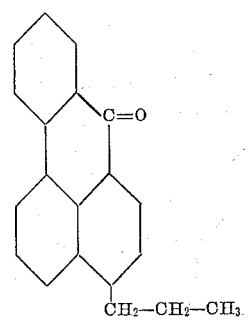

crystallizing from glacial acetic acid in long golden yellow needles having a melting point of about 130 to 131° C.

4. A process for the production of 2-alkylbenzanthrones, which comprises treating a condensation product of a benzanthrone and a ketone corresponding to the general formula:

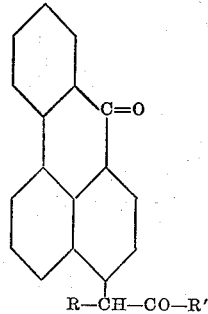

R—CH—CO—R' in which R stands for hydrogen or an alkyl group and R' stands for a hydrocarbon radicle which may be substituted, with an alkaline saponifying agent.

5. A process for the production of 2-alkylbenzanthrones, which comprises treating a condensation product of a benzanthrone and a ketone corresponding to the general formula:

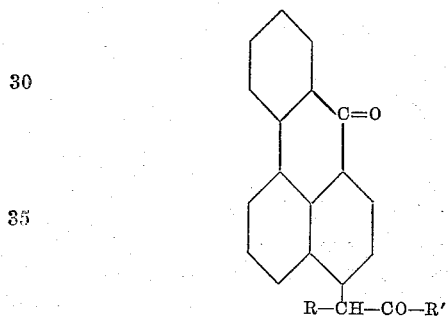

R—CH—CO—R' in which R stands for hydrogen or an alkyl group and R' stands for a hydrocarbon radicle which may be substituted, with a caustic alkaline saponifying agent.

6. A process for the production of 2-alkylbenzanthrones, which comprises treating a condensation product of a benzanthrone and a ketone corresponding to the general formula:

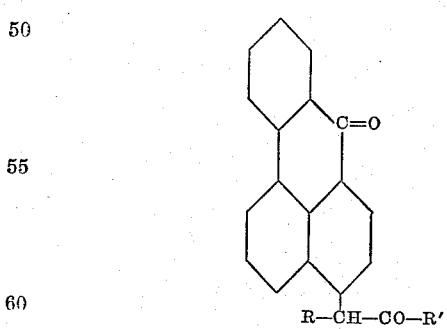

R—CH—CO—R' in which R stands for hydrogen or an alkyl group and R' stands for a hydrocarbon radicle which may be substituted, with an alcoholic caustic alkali solution.

7. As new products 2-alkylbenzanthrones corresponding to the general formula:

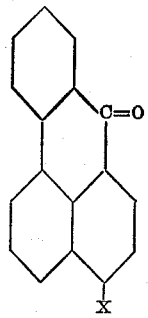

in which X stands for an alkyl radicle containing more than one carbon atom, and in which the benzanthrone ring system and the alkyl radicle may be substituted, which products are obtainable by treating a condensation product of a benzanthrone and a ketone of the general formula:

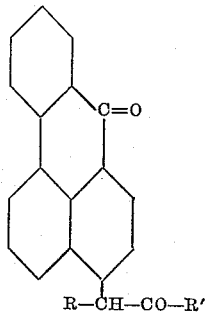

R—CH—CO—R' in which R stands for an alkyl group and R' stands for a hydrocarbon radicle which may be substituted, with an alkaline saponifying agent.

In testimony whereof we have hereunto set our hands.

ARTHUR LUETTRINGHAUS.
HEINRICH NERESHEIMER.
HANS JOSEF EMMER.